(12) United States Patent
Wei

(10) Patent No.: US 12,555,184 B2
(45) Date of Patent: Feb. 17, 2026

(54) CURVILINEAR POLYGON IMAGE SCALING METHOD, SYSTEM AND ELECTRONIC APPARATUS

(71) Applicant: Wuhan Yuwei Optical Software Co., Ltd., Hubei (CN)

(72) Inventor: Haiqing Wei, Hubei (CN)

(73) Assignee: Wuhan Yuwei Optical Software Co., Ltd., Hubei (CN)

( * ) Notice: Subject to any disclaimer, the term of this patent is extended or adjusted under 35 U.S.C. 154(b) by 299 days.

(21) Appl. No.: 18/412,592

(22) Filed: Jan. 14, 2024

(65) Prior Publication Data
US 2025/0182239 A1    Jun. 5, 2025

(30) Foreign Application Priority Data
Dec. 1, 2023   (CN) .......................... 202311628131.X

(51) Int. Cl.
 *G06T 3/40* (2024.01)
(52) U.S. Cl.
 CPC ....................... *G06T 3/40* (2013.01)
(58) Field of Classification Search
 None
 See application file for complete search history.

(56) References Cited

U.S. PATENT DOCUMENTS

| | | | |
|---|---|---|---|
| 2017/0242333 A1* | 8/2017 | Li | G03F 1/36 |
| 2020/0380362 A1* | 12/2020 | Cao | G06N 3/09 |
| 2022/0050381 A1* | 2/2022 | Biswas | G03F 7/70625 |
| 2025/0180980 A1* | 6/2025 | Wei | G03F 1/36 |

FOREIGN PATENT DOCUMENTS

WO    WO-2022179802 A1 *   9/2022   ............... G03F 1/36

OTHER PUBLICATIONS

Pang, L.—"Inverse lithography technology: 30 years from concept to practical, full-chip reality"—Bacus—Nov. 2021—pp. 1-36 (Year: 2021).*

* cited by examiner

*Primary Examiner* — Bernard Krasnic
(74) *Attorney, Agent, or Firm* — JCIPRNET

(57) ABSTRACT

The curvilinear polygon image scaling method includes: placing partial derivatives at points on edges of a curvilinear polygon image to obtain a vector gradient field; integrating the vector gradient field to obtain an auxiliary grayscale image; segmenting the edges; modulating, on the auxiliary grayscale image, to grayscale values of edgelets based on the image scaling parameter and vector gradient field and modulating to nearby grayscale values using a smoothing function to obtain an updated auxiliary grayscale image; intercepting the updated image using a threshold and extracting a polygon contour. If differences between edge placement errors of edgelets, that are between the currently extracted and the original curvilinear polygon image, and the image scaling parameter are less than the preset small value, then the currently extracted contour is used as a scaled image; otherwise, modulating iteratively until the difference is less than the preset small value.

12 Claims, 5 Drawing Sheets

CURVILINEAR POLYGON IMAGE SCALING METHOD, SYSTEM AND ELECTRONIC APPARATUS

CROSS-REFERENCE TO RELATED APPLICATION

This application claims the priority benefit of China application serial no. 202311628131.X, filed on Dec. 1, 2023. The entirety of the above-mentioned patent application is hereby incorporated by reference herein and made a part of this specification.

BACKGROUND

Technical Field

The disclosure belongs to the field of image processing, and specifically relates to a curvilinear polygon image scaling method, a system, and an electronic apparatus.

Description of Related Art

In computer image processing and computer graphics, polygon scaling is a common operating requirement and is widely used. There are currently two mainstream processing methods. One method is to move, extend, or shorten edges of the polygon through geometric operations and then re-close into a polygon through intersection points, in which the operation type and direction need to be determined for the movement of each edge while considering whether intersecting with other surrounding edges occurs. Thereby, the problem of image distortion caused by edges intersecting or coupling is likely to occur. The other method is to enlarge or reduce the image through operations such as graphic dilation and erosion, in which all the pixels of the original image are usually required to be traversed multiple times. All the pixels of the original image are slid through and traversed by the structing element to obtain the resulted image through geometric operations such as intersection, union, and complement, thereby consuming a significant amount of operation time and computational memory. The above two image scaling methods of geometric operations are greatly limited when applied to aspects such as computational lithography.

SUMMARY

In view of the shortcomings of the existing technology, the purpose of the disclosure is to provide a curvilinear polygon image scaling method, a system, and an electronic apparatus, aiming to solve the problems of image distortion, or consuming a significant amount of operation time and computational memory caused by the existing image scaling methods.

In order to achieve the above purpose, in the first aspect, the disclosure provides a curvilinear polygon image scaling method, including the following steps:

S11, placing a partial derivative at each point on edges of a curvilinear polygon to obtain a vector gradient field;

S12, integrating the vector gradient field and using an integrated value as a grayscale value to obtain an auxiliary grayscale image;

S13, segmenting the edges of the curvilinear polygon and determining a position of each edgelets;

S14, performing modulation, on the auxiliary grayscale image, to grayscale values of the respective edgelets based on a preset image scaling parameter and the obtained vector gradient field and performing modulation to nearby grayscale values thereof by using a smoothing function so that the grayscale values in a modulated area change continuously to obtain an updated auxiliary grayscale image; and S15, intercepting the updated auxiliary grayscale image by using a truncation threshold and extracting a polygon contour, and calculate the edge placement error of each edgelets between the currently extracted polygon contour and the original curvilinear polygon image. If the difference between the calculated edge placement error of each edgelet and the image scaling parameter is less than the preset small value, the currently extracted polygon contour is used as the curvilinear polygon image after scaling; otherwise, iterative modulation is performed on the updated auxiliary grayscale image to the grayscale values of the respective points whose differences are not less than the small value and nearby grayscale values thereof until the difference of each point on a finally extracted polygon contour is less than the small value.

It should be noted that the disclosure draws on the idea of level set, the vector gradient field of each point on the edges of the curvilinear polygon is first determined and then integrated. The integrated value of each point of the image is used as the grayscale value, and the two-dimensional image is converted into a three-dimensional auxiliary grayscale image. Afterward, by modulating the grayscale values on the auxiliary grayscale image and then obtaining the curvilinear polygon contour through threshold interception, the scaling of the curvilinear polygon is achieved.

It may be seen that the method provided by the disclosure does not rely on geometric operations of graphics and is not limited by pixel size or structing elements. Also, the calculation efficiency can be effectively improved, and the computational memory consumption can be reduced. At the same time, the method can avoid complex situations such as intersecting or coupling caused by the geometric operations, thereby the accuracy of scaling is ensured.

It may be understood that the curvilinear polygon image mentioned in the disclosure refers to a polygon with curvilinear edges. Therefore, the image mentioned in this disclosure may also be called graphic.

Specifically, the positive and negative directions of the vector gradient field in the disclosure may be distinguished by pointing to the inside and outside of the curvilinear polygon image.

In an optional example, an operation of performing iterative modulation, on the updated auxiliary grayscale image, to the grayscale values of the respective points whose differences are not less than the small value and nearby grayscale values thereof is executed, including the following steps:

S151, placing a partial derivative at each point in the currently extracted polygon contour whose difference is not less than the small value to obtain a vector gradient field; and S152, based on the vector gradient field obtained in Step S151, the edge placement error corresponding to each point and the image scaling parameter, performing modulation, on the updated auxiliary grayscale image, to the grayscale values of the respective points and performing modulation to nearby grayscale values thereof by using a smoothing function so that the grayscale values in a modulated area change continuously to obtain an auxiliary grayscale image updated once again.

In an optional example, in Step S152, in which performing modulation, on the updated auxiliary grayscale image, to the grayscale values of the respective points specifically includes: on the basis of the current grayscale value, accumulating the product of the scalar slope corresponding to the vector gradient field of each point of the current polygon contour and the difference between the current edge placement error and the image scaling parameter to obtain the modulated grayscale value.

Specifically, since the grayscale value may not be modulated accurately by one modulation operation, iterative modulation is needed. During a process of the iterative modulation, the modulation is performed with reference to the difference between the current edge placement error at the center point or control point of each edgelet and the image scaling parameter so that an accurate curvilinear polygon contour after being scaled can be extracted as quickly as possible.

Persons skilled in the art should understand that the disclosure adopts the method of auxiliary grayscale image, by modulating the grayscale values on the auxiliary grayscale image and then achieving the scaling of the curvilinear polygon image through threshold interception, in which there is no need to traverse every point on the original curvilinear polygon image, no need to dilate or erode each point on the original curvilinear polygon image, and the scaled contour can be accurately found through iteratively optimizing the grayscale values on the auxiliary grayscale image, thereby the efficiency and accuracy of the scaling are both achieved.

In an optional example, the partial derivative is a continuous function with a finite integral.

In an optional example, Step S11 further includes the following.

Based on the vector gradient field at each point on the edge of the curvilinear polygon image, the scalar slope field image along the normal direction of the edge of the curvilinear polygon image is obtained, and two scalar slope field images in two coordinate axis directions corresponding to the vector gradient field are obtained and stored to facilitate performing subsequent steps.

In an optional example, the smoothing function is at least one of a Gaussian function or a low-pass filter function.

In an optional example, the truncation threshold is a grayscale value determined by the partial derivative function placed when the vector gradient field is generated and the grayscale value range of the initially obtained auxiliary grayscale image. When the truncation threshold is used to intercept the initial auxiliary grayscale image, the polygon contour extracted is consistent with the edges of the curvilinear polygon image.

It should be noted that the partial derivative function $f(x,y)$ may be any unimodal continuous function with an integrated value as a finite value, or may be customized, and the function is required to meet:

$$\lim_{x \to \pm\infty, y \to \pm\infty} f(x, y) = 0, \iint f(x, y)dxdy = F,$$

where F is a limited value, and $f(x,y)$ is distributed as unimodal on the x-y plane. The threshold may be set to be a value within the integrated value range (0, F) of the function. Preferably, if the unimodal distribution of $f(x,y)$ has symmetry, then the threshold may be a value of F/2.

Specifically, if the partial derivative function is a Gaussian function, and the grayscale value of the auxiliary grayscale image obtained by the initial integration is from 0 to 1, then the grayscale value of the internal point of the curvilinear polygon image on the auxiliary grayscale image approaches 1, and the grayscale value of the external point of the curvilinear polygon image on the auxiliary grayscale image approaches 0. The truncation threshold may be set as 0.5, and when the initial auxiliary grayscale image is obtained, with the truncation threshold 0.5 used to intercept, the polygon contour extracted is consistent with the edges of the curvilinear polygon image.

Furthermore, when scaling the curvilinear polygon image, by modulating the grayscale values of the edgelets of the curvilinear polygon and in a neighborhood thereof on the auxiliary grayscale image and then intercepting by the truncation threshold 0.5, the scaled polygon contour is obtained.

In an optional example, the curvilinear polygon image includes any curvilinear polygon image and the Manhattan image.

In an optional example, when modulating the grayscale value of each edgelet, the grayscale value of a center point or a control point on each edgelet is modulated, and then the grayscale value in a neighborhood thereof is modulated, in which the center point or the control point does not always need to be on a pixel point, but may be any point on each edgelets.

In the second aspect, the disclosure provides a curvilinear polygon image scaling system, which includes the following.

A gradient field obtaining module is configured to place a partial derivative at each point on edges of a curvilinear polygon image to obtain a vector gradient field.

An auxiliary grayscale image obtaining module is configured to integrate the vector gradient field and use an integrated value as a grayscale value to obtain an auxiliary grayscale image.

A segmentation module is configured to segment the edges of the curvilinear polygon image and determine a position of each edgelet.

A grayscale modulation module is configured to perform modulation, on the auxiliary grayscale image, to grayscale values of the respective edgelets based on a preset image scaling parameter and the obtained vector gradient field and perform modulation to nearby grayscale values thereof by using a smoothing function so that the grayscale values in a modulated area change continuously to obtain an updated auxiliary grayscale image.

An image interception module is configured to intercept the updated auxiliary grayscale image by using a truncation threshold to extract a polygon contour. If a difference between an edge placement error of each edgelet, which is calculated between the currently extracted polygon contour and the original curvilinear polygon image, and the image scaling parameter is less than the preset small value, then the currently extracted polygon contour is used as the curvilinear polygon image after scaling according to the image scaling parameter. Otherwise, iterative modulation is performed on the updated auxiliary grayscale image to the grayscale values of the respective points whose differences are not less than the preset small value and nearby grayscale values thereof until the difference of each point on a finally extracted polygon contour is less than the small value.

In an optional example, the gradient field obtaining module is further configured to place a partial derivative at each point in the currently extracted polygon contour whose difference is not less than the preset small value to obtain the vector gradient field.

The grayscale modulation module is further configured to modulate the grayscale value of each point on the updated auxiliary grayscale image based on a latest vector gradient field, the edge placement error corresponding to each point, and the image scaling parameter and perform modulation to nearby grayscale values thereof by using a smoothing function so that the grayscale values in a modulated area change continuously to obtain the updated auxiliary grayscale image.

In the third aspect, the disclosure provides an electronic apparatus, which includes at least one storage configured to store a program, at least one processor configured to perform the program stored in the storage, in which when performing the program stored in the storage, the processor is configured to perform the method described in the first aspect or any optional example of the first aspect.

In the fourth aspect, the disclosure provides a computer-readable storage medium. The computer-readable storage medium stores a computer program. When the computer program is run on the processor, the processor is enabled to perform the method described in the first aspect or any optional example of the first aspect.

In the fifth aspect, the disclosure provides a computer program product. When the computer program product is run on a processor, the processor is enabled to perform the method described in the first aspect or any optional example of the first aspect.

It may be understood that beneficial effects from the second aspect to the fifth aspect may be found in the relevant descriptions in the first aspect, so will not be repeated here.

Generally speaking, compared with the related art, the above technical solution conceived by the disclosure has beneficial effects as the following.

The disclosure provides a curvilinear polygon image scaling method, a system, and an electronic apparatus, performing segmentation and pixelated representation of an original image, and through which an auxiliary image and an initial gradient field through are constructed. The auxiliary image is iteratively optimized and a truncation threshold is set, in which an iteration stopping criterion is when the edge placement error between the truncated image and the original image reaches the value that needs to be enlarged or reduced, thereby the enlargement or reduction of the original image is achieved. The method does not rely on image geometric operations, hence the calculation efficiency can be effectively improved, and the computational memory consumption can be reduced.

The disclosure provides a curvilinear polygon image scaling method, a system, and an electronic apparatus. The method may be applied to any curvilinear polygon image, and may also be applied to the Manhattan image. When applied to curvilinear polygon images, the evaluation of the enlargement or reduction effect of the image is judged by the edge placement error of each edgelet between the scaled image and the original image along the normal direction outward or inward. When applied to the Manhattan image, the evaluation is judged by the calculation method of the segmentation and edge placement error of the Manhattan image, in which during the movement at the corner, simple geometric operations such as stitching and removal are considered to be completed automatically. Compared with the image expansion and reduction method that uses image geometric operations, the method of the disclosure is not limited by pixel size or structing elements.

The disclosure provides a curvilinear polygon image scaling method, a system, and an electronic apparatus. In the first generation process, the auxiliary grayscale image involved merely relies on the original image and does not rely on any other operations or auxiliary parameters, in which the generation process is easy to be implemented. In the optimization process of the auxiliary image, what is better than the geometric operation that relies on pixels is that the center point or the control point of each edgelet does not always need to be on the pixel point. Through inverse interpolation, the value of the center point or the control point of any position can be adjusted, thereby the continuous optimization of the auxiliary image is achieved.

DESCRIPTION OF THE EMBODIMENTS

In order to make the purpose, technical solutions, and advantages of the disclosure clear, the disclosure will be further described in detail below with reference to the accompanying drawings and embodiments. It should be understood that the specific embodiments described here are merely used to explain the disclosure rather than to limit the disclosure.

The term "and/or" in this article is an association relationship that describes related objects, indicating that there may be three types of relationships. For example, A and/or B may mean three situations: A exists alone, A and B exist simultaneously, and B exists alone. The symbol "/" in this article indicates that either of the associated objects may exist, for example, A/B means A or B.

In an embodiment of the disclosure, the words "exemplary" or "for example" are used to represent examples, illustrations, or explanations. Any embodiment or design described as "exemplary" or "for example" in the embodiments is not to be construed as preferred or advantageous over other embodiments or designs. Rather, use of the words "exemplary" or "for example" is intended to present the concept in a specific manner.

Next, the technical solution provided according to the embodiments of the disclosure is introduced.

The disclosure provides a curvilinear polygon image scaling method, the method aims to apply the idea of level set to enlarge or reduce a polygon image by constructing and optimizing an auxiliary image, and the entire process does not rely on geometric operations, thereby the computational efficiency is improved, the computational memory consumption is reduced, and complex situations such as intersecting or coupling caused by the geometric operations are avoided.

Figure 1:
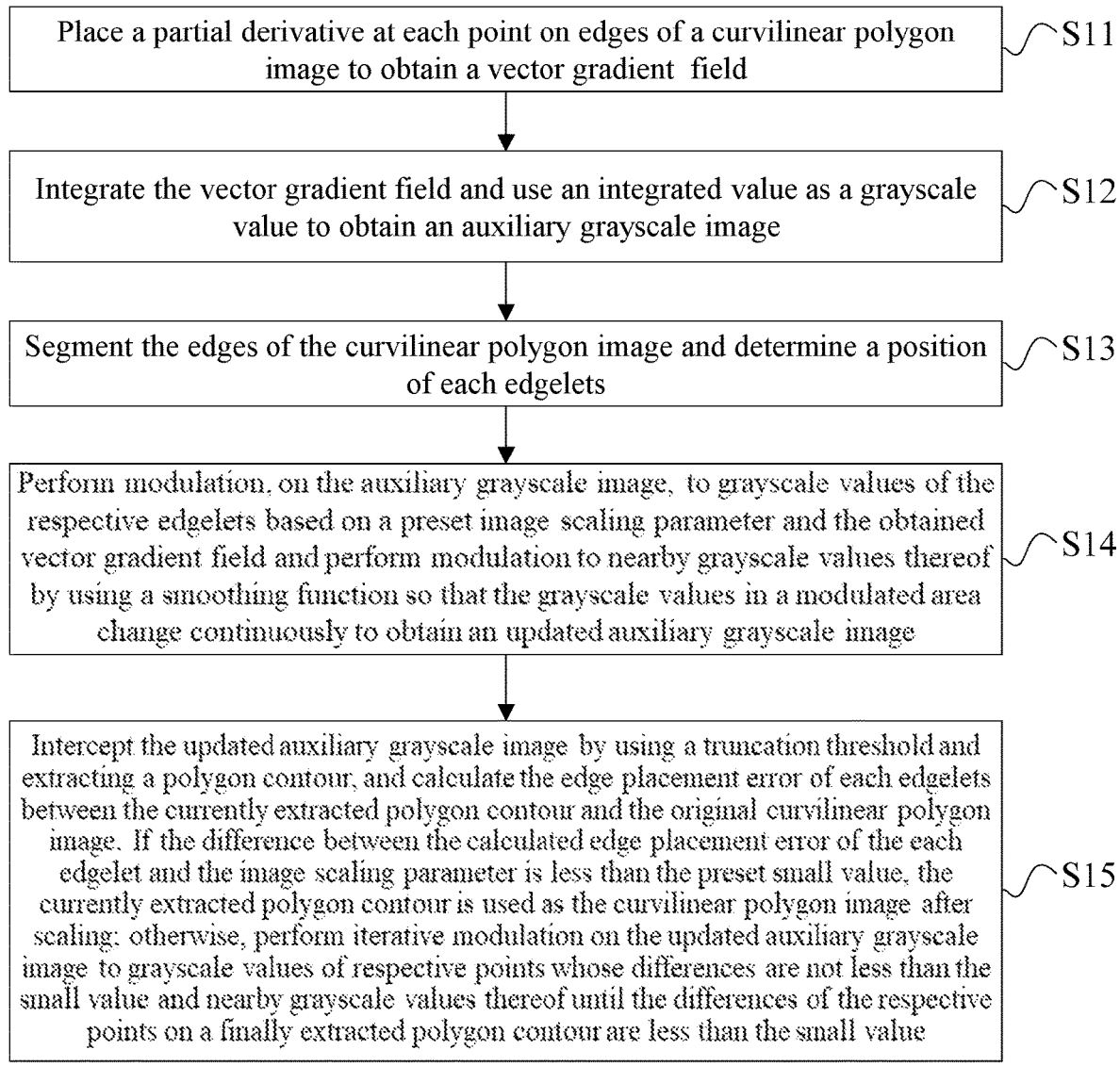
FIG. 1 is a flow chart of a curvilinear polygon image scaling method according to an embodiment of the disclosure.

FIG. 1 is a flow chart of a curvilinear polygon image scaling method according to an embodiment of the disclosure. As shown in FIG. 1, the method includes the following steps:

S11, placing a partial derivative at each point on edges of a curvilinear polygon image to obtain a vector gradient field;

S12, integrating the vector gradient field and using an integrated value as a grayscale value to obtain an auxiliary grayscale image;

S13, segmenting the edges of the curvilinear polygon image and determining a position of each edgelets;

S14, performing modulation, on the auxiliary grayscale image, to grayscale values of the respective edgelets based on a preset image scaling parameter and the obtained vector gradient field and performing modulation to nearby grayscale values thereof by using a smoothing function so that the grayscale values in a modulated area change continuously to obtain an updated auxiliary grayscale image;

S15, intercepting the updated auxiliary grayscale image by using a truncation threshold and extracting a polygon contour, in which if a difference between an edge placement error of each edgelets, which is calculated between the currently extracted polygon contour and the original curvilinear polygon image, and the image scaling parameter is less than the preset small value, then the currently extracted polygon contour is used as the curvilinear polygon image after scaling according to the image scaling parameter; otherwise, performing iterative modulation, on the updated auxiliary grayscale image, to the grayscale values of the respective points whose differences are not less than the preset small value and nearby grayscale values thereof until the difference of each point on a finally extracted polygon contour is less than the preset small value.

Figure 2:
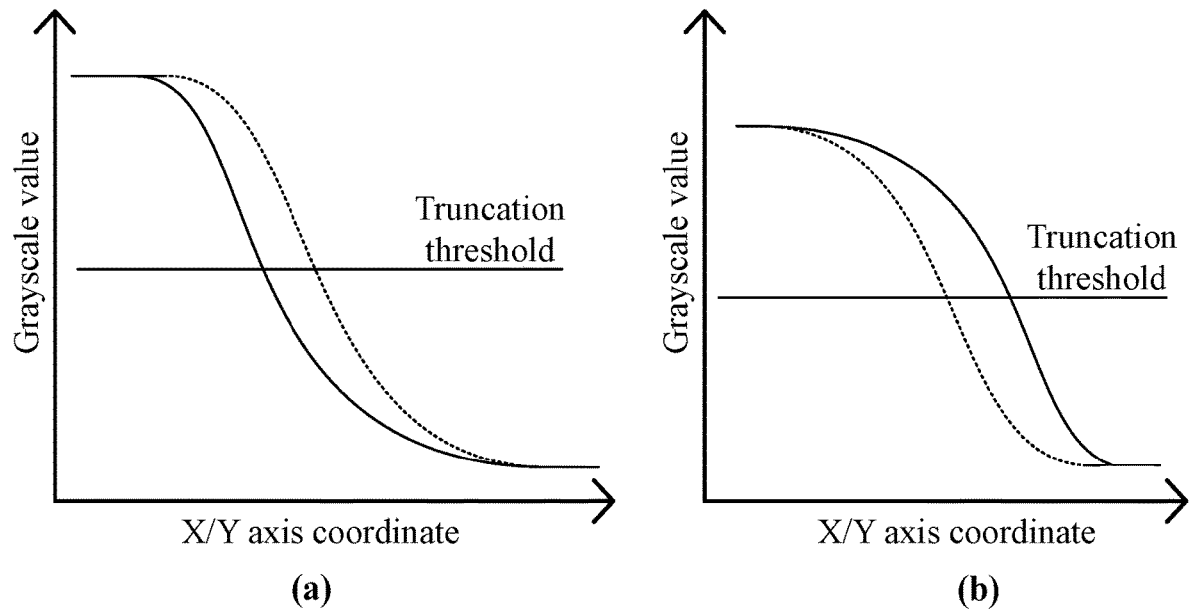
FIG. 2 is a schematic diagram of image scaling and interception according to an embodiment of the disclosure.

Referring to FIG. 2, (a) in FIG. 2 shows the modulation change of grayscale values on the auxiliary grayscale image when the curvilinear polygon image is enlarged, and (b) in FIG. 2 shows the modulation change of grayscale values on the auxiliary grayscale image when the curvilinear polygon image is reduced. Among the grayscale value curves in FIG. 2, the solid line represents the grayscale value distribution before modulation, and the dotted line represents the grayscale value distribution after modulation.

Figure 3:
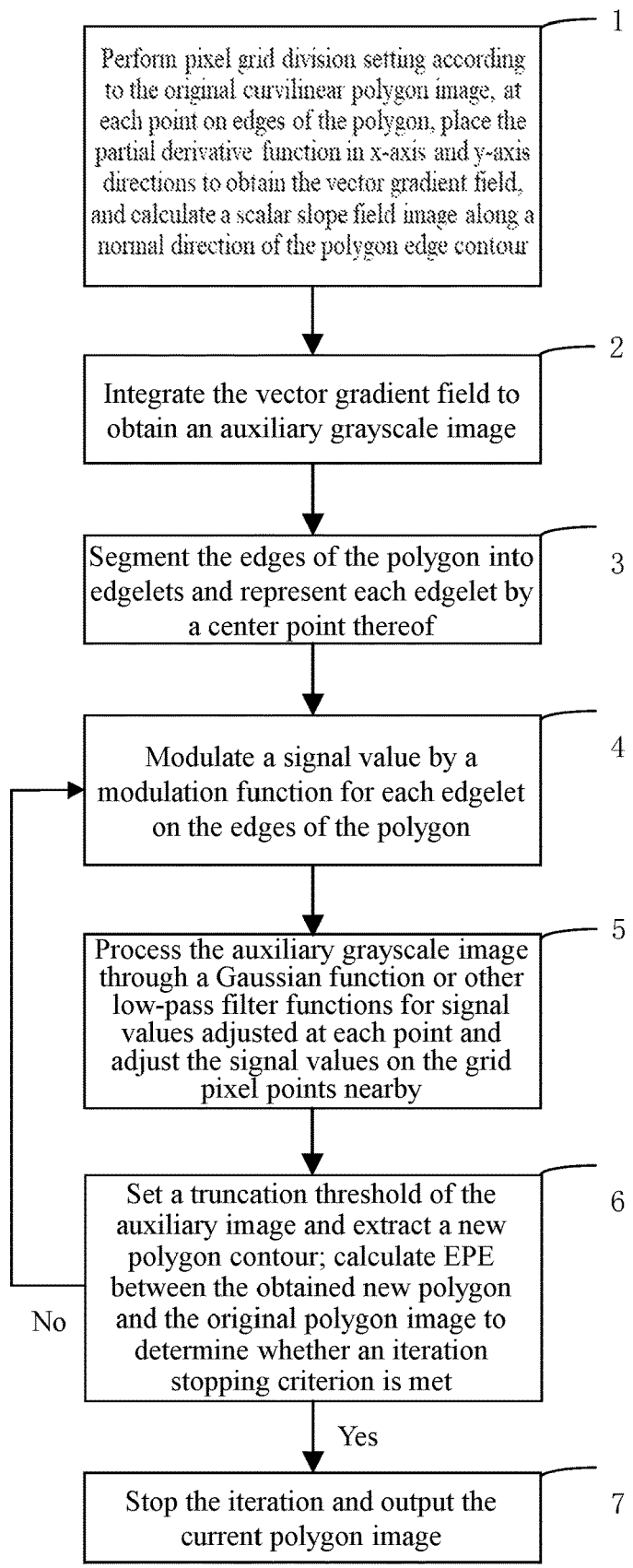
FIG. 3 is another implementation flow chart of the curvilinear polygon image scaling method according to an embodiment of the disclosure.

In a specific embodiment, the curvilinear polygon image scaling method according to the disclosure, as shown in FIG. 3, includes the following steps.

In Step 1, pixel grid division setting is performed according to the original curvilinear polygon image. At each point on edges of the polygon, a partial derivative function in x-axis and y-axis directions is placed to obtain the vector gradient field. A scalar slope field image along a normal direction of the polygon edge contour is calculated.

It should be noted that the symbol of slope is usually defined according to the inside and outside of the polygon image, for example, but not limited to, setting the positive direction of the scalar slope as pointing to the inside of the polygon. The partial derivative placed here may be set as, but is not limited to, an approximate pulse function.

In Step 2, the vector gradient field in Step 1 is integrated to obtain an auxiliary grayscale image.

In Step 3, the edges of the polygon are segmented into edgelets. Each edgelet may be represented by a center point thereof or a control point set separately. The mathematical representation of each edgelet here is not limited to using a single point. Multiple control points may also be selected to obtain a weighted average to serve as the representation.

In Step 4, for each edgelet on the edges of the polygon, a modulation function is adopted to modulate the signal value thereof. I is used to represent the signal value, and the modulation function is set to modulate each edgelet. For example, but not limited to, in a first iteration, $I_1$ (ECP)=$I_0$ (ECP)+$Slope_0$ (ECP)×Bias, in which ECP is the abbreviation of edgelet center point, $Slope_0$ represents the scalar slope set in Step 1, and Bias represents a parameter to enlarge or reduce the size of the image, that is, to move the Bias outward to enlarge or to move the Bias inward to reduce, and a unit in length is usually adopted. In a kth iteration (k>1), $I_k$ (ECP)=$I_{k-1}$ (ECP)+$Slope_{k-1}$ (ECP)×[$EPE_{k-1}$ (ECP)−Bias], in which $Slope_{k-1}$ represents the scalar slope according to the k−1th iteration, and $EPE_{k-1}$ (ECP) is the edge placement error between the image generated at the k−1th iteration and the original image, whose unit is consistent with the Bias, in which the edge placement error may be referred to as EPE.

In Step 5, at each point adjusted in Step 4, the auxiliary grayscale image is processed through a Gaussian function or other low-pass filter functions, and the signal values on the grid pixel points nearby are adjusted. Here, the value of $\sigma$ of the Gaussian function or a width w of other low-pass filter functions is usually similar to the size of several pixel points. If the value of $\sigma$ or w is large, then a large range is affected and image distortion is caused. If the value of $\sigma$ or w is small, then likely it is impossible to adjust the pixel points nearby through inverse interpolation or other means.

In Step 6, a truncation threshold Threshold of the auxiliary image is set and a new polygon contour is extracted. The edge placement error of each edgelet between the extracted polygon and the original polygon image is calculated to determine whether an iteration stopping criterion is met. If the stopping criterion is met, then Step 7 is proceeded. If the iteration stopping criterion is not met, then Step 4 is proceeded. The iteration stopping criterion here may be set to, but is not limited to, one or a combination of the following criterions, such as: setting the edge placement error of each edgelet to be within an interval [Bias-ε, Bias+ε], or |EPE−bias|≤ε; setting the sum of the absolute values of the differences between the edge placement error and bias of all edgelets to be within a set range parameter ζ, that is, sum |EPE−bias|≤ζ; and the number of iterations reaches a set upper limit.

It should be noted that proceeding to Step 4 refers to: at each point where the edge placement error does not meet the stopping criterion, placing the derivative along the normal direction to obtain the corresponding scalar slope $Slope_{k-1}$ (ECP). Afterward, iterative modulation is performed with reference to: $I_k$ (ECP)=$I_{k-1}$ (ECP)+$Slope_{k-1}$ (ECP)×[$EPE_{k-1}$ (ECP)−Bias] as described in Step 4.

In Step 7, the iteration is stopped and the current polygon image is output, which is a scaled polygon image.

Specifically, the disclosure uses the original polygon image to generate and optimize an auxiliary image, converting the image scaling problem into the optimization problem of the auxiliary grayscale image and iteratively solving the optimization problem by setting the target function and the stopping criterion. The application of the disclosure is not limited by the representation method of the curvilinear polygon image. The original image may use any representation or description method, as long as the polygon image can be clearly expressed. The pixelated image representation may adopt, but is not limited to, a spatial rectangular coordinate system. When placing the partial derivative function to obtain the vector field image, the partial derivative may be split according to the selected coordinate expression method to facilitate storage and processing. For example, but not limited to, when using the rectangular coordinate system, the partial derivative may be split into two images ∂/∂x and ∂/∂y to be stored and processed.

Furthermore, the disclosure is not limited by the definition and calculation of polygon image features and edge placement error. The curvilinear polygon image includes but is not limited to free curvilinear image, Manhattan image, etc. The edge placement error calculation method includes but is not limited to normal distance calculation of free curvilinear mask, vertical or horizontal distance calculation of Manhattan image, etc.

Figure 4:
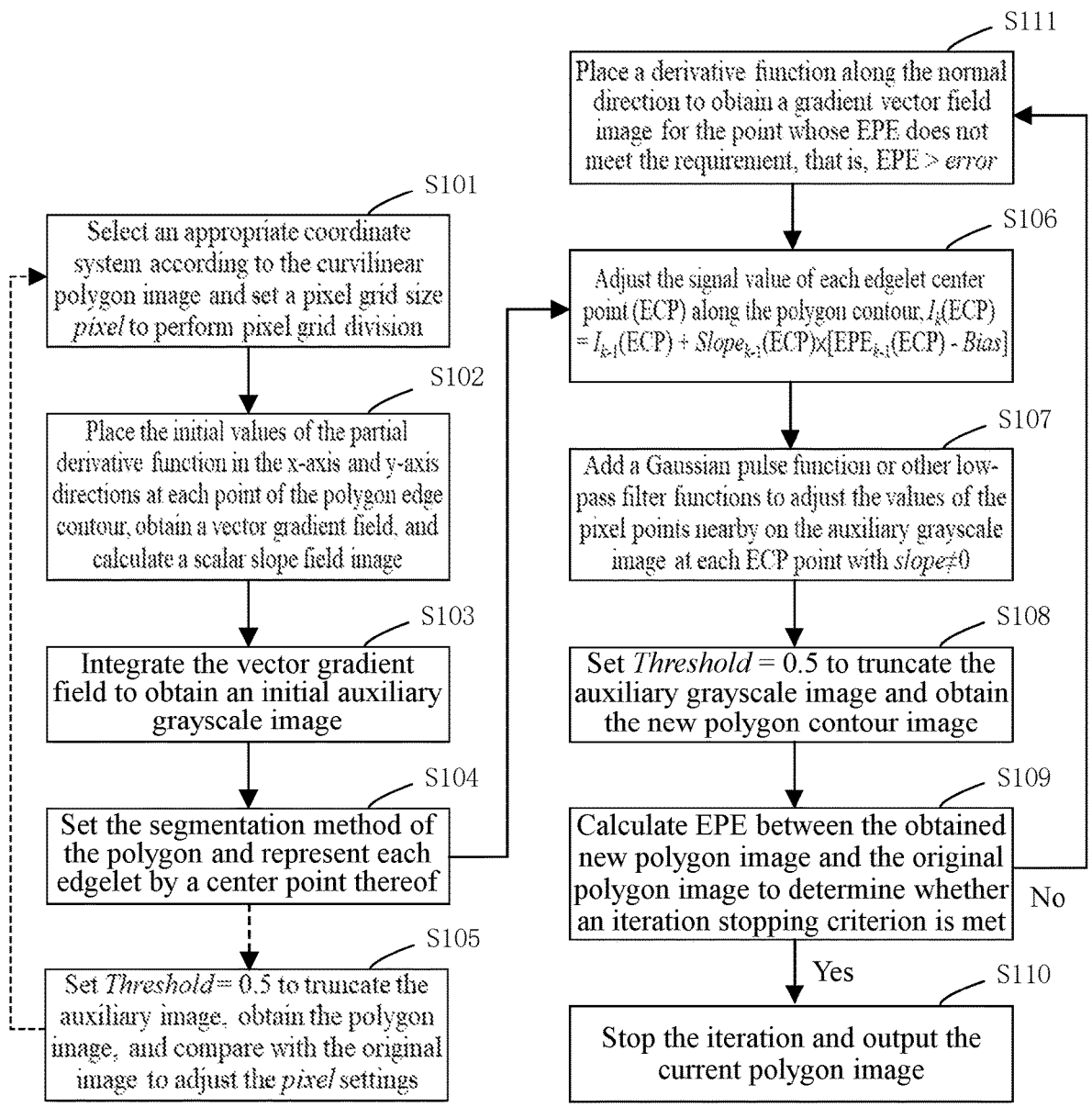
FIG. 4 is a specific implementation flow chart for the outward expansion of a curvilinear polygon contour according to an embodiment of the disclosure.

For example, the disclosure is applicable to the requirement of enlarging a polygon contour outward to a certain size, or reducing inward to a certain size. The disclosure will be explained below by taking the curvilinear polygon image contour to enlarge outward Bias as an example. The specific implementation, as shown in FIG. 4, includes the following steps.

In Step S101, according to the curvilinear polygon image, an appropriate coordinate system is selected, in which the coordinate system may be but is not limited to a plane rectangular coordinate system. A pixel grid size pixel is set to perform the pixel grid division. The value pixel is an adjustable value and may be adjusted according to requirements during the actual application.

In Step S102, on the basis of Step S101, pixelated representation is performed on the polygon. At each point of the polygon edge contour, the initial values of the partial derivative function in the x-axis and y-axis directions are placed, in which it is aimed to generate an initial vector gradient field through the polygon contour image and calculate a scalar slope field image. The initial direction of the scalar slope is recommended but not limited to the normal direction along the edge of the polygon contour, and the definitions of the positive and negative directions are recommended but not limited to be defined as pointing to the inside and outside of the polygon. The initial partial derivative placed may adopt, but is not limited to, an approximate pulse function. If a plane rectangular coordinate system is adopted, the vector gradient field may be represented by (∂/∂x, ∂/∂y), which may be split into two images ∂/∂x and ∂/∂y to be stored and processed respectively.

In Step S103, the vector gradient field generated in Step S102 is integrated to obtain an initial auxiliary grayscale image. If the initial partial derivative placed in Step S102 is a Gaussian function and the initial slope direction is toward the inside of the polygon, then the signal value range of the obtained initial auxiliary image is [0, 1], the signal value of the pixel point inside the polygon gradually approaches 1, and the signal value of the pixel point outside gradually approaches 0.

In Step S104, the segmentation method of the polygon is set, which may be but is not limited to the segmentation method based on the pixel grid. For a simple polygon image, the segmentation method of classifying and labeling the edgelets may also be used. For each edgelet after the segmentation, a center point may be used as the representative of each edgelet. For the segmentation of classifying and labeling the edgelets, one or several control points may also be set as the representative of each edgelet.

In Step S105, Threshold=0.5 is set to truncate the auxiliary image and the polygon image is obtained, in which the image should theoretically be the original polygon image, but since the image is represented by using a pixelated representation method, the image may be slightly different from the original image. If necessary, the intercepted polygon image may be compared with the original image, proceed to Step S101, adjust the pixel settings or the pixel grid division method, and then enter subsequent steps until the requirement is met. It should be noted that the Threshold mentioned here may be set to any value. Here, 0.5 is selected as the truncation value after normalizing the signal value of the auxiliary image. In actual applications, an appropriate value may be set according to the specific application scenarios and situations. This Step is a verification adjustment step and is not mandatory during the application process.

In Step S106, the signal value I of each edgelet center point (ECP) is adjusted along the polygon contour. In the kth iteration, for each edgelet, $I_k(ECP)=I_{k-1}(ECP)+Slope_{k-1}(ECP)\times[EPE_{k-1}(ECP)-Bias]$. I is the signal value of the auxiliary grayscale image. In the first iteration, $Slope_0$ is the scalar slope field calculated in Step S102, and $EPE_0$ may be set to 0 or the edge placement error between the image generated in Step S105 and the original image. In the kth iteration (k>1), $Slope_{k-1}$ represents the scalar slope field calculated from the vector gradient field generated in Step S111 after the last iteration, and $EPE_{k-1}$ (ECP) is the edge placement error between the image generated in the k−1th iteration and the original image, whose unit is consistent with the Bias.

In Step S107, at each ECP point with slope≠0, a Gaussian pulse function or other low-pass filter functions is added to adjust the values of the pixel points nearby on the auxiliary grayscale image. In the first iteration, the point with slope≠0 is the center point of each edgelet center point (ECP). In subsequent iterations, the point with slope≠0 is the edgelet center point (ECP) whose edge placement error does not meet the requirement (EPE>error). Here, error is the small value set to determine whether the edge placement error meets the requirement. The value of σ of the Gaussian function or a width w of other low-pass filter functions is usually similar to the size of several pixel points. If the value of σ or w is large, then a large range is affected and image distortion is caused. If the value of σ or w is small, then likely it is impossible to perform inverse interpolation to surrounding pixel points. For points whose ECP are on the pixel grid, the values of the surrounding pixel points are calculated based on the Gaussian pulse function and the adjustment is performed. For points whose ECP are not on the pixel grid, the values of surrounding adjacent pixel points may be calculated through inverse interpolation. The applicable inverse interpolation methods can be but not limited to inverse quadratic interpolation, inverse bilinear interpolation, or inverse parabolic interpolation method, etc. Through Step S106 and Step S107, the signal values on the auxiliary image are partially adjusted, mainly concentrated near the polygon contour.

In Step S108, Threshold=0.5 is set to truncate the auxiliary grayscale image obtained through Step S107 and a new polygon contour image is obtained. The Threshold here may be set to any value, and the value may be set to truncate the auxiliary image according to actual needs during the application process.

In Step S109, the edge placement error between the new polygon image generated in Step S108 and the original image is calculated. The goal of iterative optimization is to make all edge placement errors between the obtained polygon image and the original image differ by bias. Accordingly, the iteration stopping criterion may be, but is not limited to, set to one or a combination of the following criterions. Firstly, the difference between the edge placement error of each edgelet and bias is within the preset small value $[-\varepsilon, \varepsilon]$, that is, for all edgelets, $|EPE\text{-}bias| \leq \varepsilon$ is met, in which the small value $\varepsilon$ may be set or modulated; secondly, the sum of the absolute values of the difference between the edge placement error of all edgelets and bias is within a certain range $[-\zeta, \zeta]$, that is, sum $|EPE\text{-}bias| \leq \zeta$, and the range parameter $\zeta$ may be set or modulated; thirdly, the number of iterations reaches the set upper limit. Whether the iteration stopping criterion is met is determined. If the stopping criterion is met, then Step S110 is proceeded. If the iteration stopping criterion is not met, then Step S111 is proceeded and the number of iterations k=k+1 is recorded.

In Step S110, the iteration is stopped and the polygon image generated in Step S108 is output as the result.

In Step S111, for points whose edge placement error does not meet the requirement, that is, points where EPE>error, the derivative function is placed along the normal direction. The symbol is determined by the symbol of the difference between the edge placement error and bias. The vector field image is obtained and a new scalar slope field is calculated accordingly, and S106 is proceeded to enter a new round of iteration.

It may be understood that the specific implementation process of reducing to the certain size is similar to the above-mentioned enlarging process, so will not be repeated here.

Figure 5:
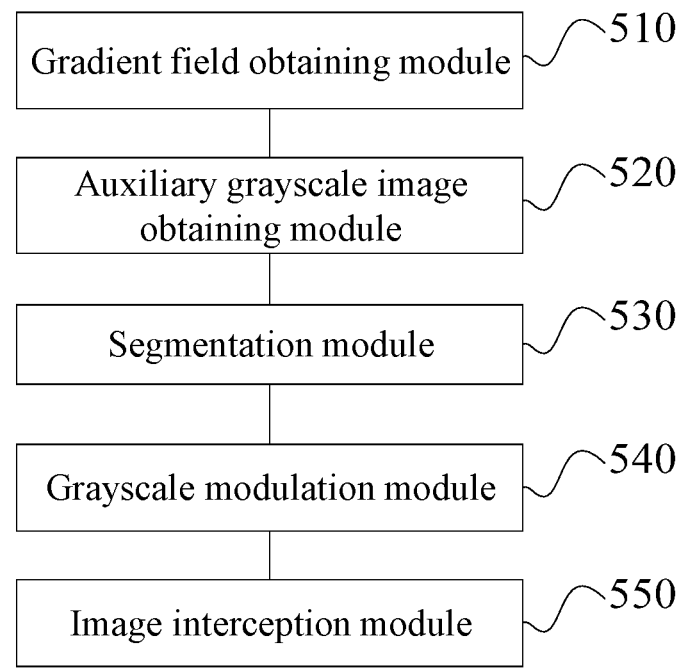
FIG. 5 is a structural diagram of a curvilinear polygon image scaling system according to an embodiment of the disclosure.

FIG. 5 is a structural diagram of a curvilinear polygon image scaling system according to an embodiment of the disclosure, as shown in FIG. 5, including the following.

A gradient field obtaining module 510 is configured to place a partial derivative at each point on edges of a curvilinear polygon image to obtain a vector gradient field.

An auxiliary grayscale image obtaining module 520 is configured to integrate the vector gradient field and use an integrated value as a grayscale value to obtain an auxiliary grayscale image.

A segmentation module 530 is configured to segment the edges of the curvilinear polygon image and determine a position of each edgelet.

A grayscale modulation module 540 is configured to perform modulation, on the auxiliary grayscale image, to grayscale values of the respective edgelets based on a preset image scaling parameter and the obtained vector gradient field and perform modulation to nearby grayscale values thereof by using a smoothing function so that the grayscale values in a modulated area change continuously to obtain an updated auxiliary grayscale image.

An image interception module 550 is configured to intercept the updated auxiliary grayscale image by using a truncation threshold to extract a polygon contour. If a difference between an edge placement error of each edgelets, which is calculated between the currently extracted polygon contour and the original curvilinear polygon image, and the image scaling parameter is less than the preset small value, then the currently extracted polygon contour is used as the curvilinear polygon image after scaling according to the image scaling parameter. Otherwise, iterative modulation is performed on the updated auxiliary grayscale image to the grayscale values of the respective points whose differences are not less than the preset small value and nearby grayscale values thereof until the difference of each point on a finally extracted polygon contour is less than the preset small value.

Moreover, the gradient field obtaining module 510 is further configured to place a partial derivative at each point in the currently extracted polygon contour whose difference is not less than the preset small value to obtain the vector gradient field.

The grayscale modulation module 540 is further configured to modulate the grayscale value of each point on the updated auxiliary grayscale image based on a latest vector gradient field, the edge placement error corresponding to each point, and the image scaling parameter and perform modulation to nearby grayscale values thereof by using a smoothing function so that the grayscale values in a modulated area change continuously to obtain the updated auxiliary grayscale image.

It should be understood that the system is configured to perform the method in the above embodiments, and the implementation principles and technical effects of the corresponding program module in the system is similar to the description in the method. For the working process of the system, reference may be made to the corresponding process in the above method, so will not be repeated here.

Based on the method in the embodiments, an electronic apparatus is provided according to the embodiments of the disclosure. The apparatus may include at least one storage configured to store a program and at least one processor configured to perform the program stored in the storage. When performing the program stored in the storage, the processor is configured to perform the method described in the above embodiments.

Based on the method in the embodiments, a computer-readable storage medium is provided according to the embodiments of the disclosure. The computer-readable storage medium stores a computer program. When the computer program is run on the processor, the processor is enabled to perform the method described in the above embodiments.

Based on the method in the embodiments, a computer program product is provided according to the embodiments of the disclosure. When the computer program product is run on a processor, the processor is enabled to perform the method described in the above embodiments. It may be understood that the processor in the embodiments of the disclosure may be a central processing unit (CPU), other general-purpose processors, a digital signal processor (DSP), an application specific integrated circuit (ASIC), a field programmable gate array (FPGA), or other programmable logic devices, transistor logic devices, hardware components, or any combination thereof. A general-purpose processor may be a microprocessor or any conventional processor.

The steps of the method according to the embodiments of the disclosure may be implemented by hardware or by the processor executing a software command. The software command may comprise corresponding software modules, and the software modules may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well known in the art. An exemplary storage medium is coupled to a processor such that the processor can read information from the storage medium and write information to the storage medium. Certainly, the storage medium may also be a component of the processor. The processor and the storage medium may be located in an ASIC.

The above embodiments may be implemented in whole or in part by software, hardware, firmware or any combination thereof. When implemented using software, the embodiments may be implemented in whole or in part in the form of a computer program product. The computer program product includes one or more computer commands. When the computer program command is loaded and executed on a computer, the processes or functions described in the embodiments of the disclosure are generated in whole or in part. The computer may be a general-purpose computer, a special-purpose computer, a computer network, or other programmable device. The computer command may be stored in a computer-readable storage medium or transmitted through the computer-readable storage medium. The computer command may be sent from a website, a computer, a server, or a data center via wired (such as coaxial cable, optical fiber, digital subscriber line (DSL)) or wireless (such as infrared, wireless, microwave) manner to perform transmission to another website, computer, server, or data center. The computer-readable storage medium may be any available medium that the computer can access, or a data storage device such as a server, data center integrated with one or more available media. The available medium may be a magnetic medium (e.g., floppy disk, hard disk, tape), an optical medium (e.g., DVD), or a semiconductor medium (e.g., solid state disk (SSD)), etc.

It may be understood that the various reference numerals involved in the embodiments of the disclosure are merely for convenience of description rather than to limit the scope of the embodiments of the disclosure.

Persons skilled in the art may understand that the above are merely preferred embodiments of the disclosure and are not intended to limit the disclosure. Any modifications, equivalent substitutions, and improvements made within the spirit and principles of the disclosure shall be regarded as within the protection scope of the disclosure.

What is claimed is:

1. A curvilinear polygon image scaling method, comprising steps as follows:
    S11, placing a partial derivative at each point on edges of a curvilinear polygon image to obtain a vector gradient field;
    S12, integrating the vector gradient field and using the integrated value as a grayscale value to obtain an auxiliary grayscale image;
    S13, segmenting the edges of the curvilinear polygon image and determining a position of each edgelets;
    S14, performing modulation, on the auxiliary grayscale image, to grayscale values of the respective edgelets based on a preset image scaling parameter and the obtained vector gradient field, and performing modulation to nearby grayscale values thereof by using a smoothing function so that the grayscale values in a modulated area change continuously to obtain an updated auxiliary grayscale image; and
    S15, intercepting the updated auxiliary grayscale image by using a truncation threshold and extracting a polygon contour, wherein if a difference between an edge placement error of the respective edgelets, which is calculated between the currently extracted polygon contour and the original curvilinear polygon image, and the image scaling parameter is less than a preset small value, then the currently extracted polygon contour is used and outputted as the curvilinear polygon image after scaling according to the image scaling parameter; otherwise, iterative modulation is performed on the updated auxiliary grayscale image to grayscale values of respective points whose differences are not less than the preset small value and nearby grayscale values thereof until the differences of the respective points on a finally extracted polygon contour are less than the preset small value, and the finally extracted polygon contour is output as the curvilinear polygon image.

2. The method as claimed in claim 1, wherein performing iterative modulation, on the updated auxiliary grayscale image, to the grayscale values of the respective points whose differences are not less than the preset small value and the nearby grayscale values thereof comprises steps as follows:
    S151, placing a partial derivative at each point in the currently extracted polygon contour whose difference is not less than the preset small value to obtain a vector gradient field; and
    S152, performing modulation, on the updated auxiliary grayscale image, to grayscale values of the respective points and performing modulation to nearby grayscale values thereof by using the smoothing function based on the vector gradient field obtained in the step S151, an edge placement error corresponding to the respective point, and the image scaling parameter so that the grayscale values in a modulated area change continuously to obtain an auxiliary grayscale image updated once again.

3. The method as claimed in claim 2, wherein in the step S152, performing modulation, on the updated auxiliary grayscale image, to the grayscale values of the respective points, comprises:
    accumulating a product of a scalar slope corresponding to the vector gradient field of the respective point of the currently extracted polygon contour and the difference between the current edge placement error and the image scaling parameter based on the current grayscale values to obtain modulated grayscale values.

4. The method as claimed in claim 1, wherein the partial derivative is a continuous function with a finite integral.

5. The method as claimed in claim 1, wherein the step S11 further comprises:
    obtaining a scalar slope field image along a normal direction of the edges of the curvilinear polygon image based on the vector gradient field at the respective point on the edges of the curvilinear polygon image to obtain scalar slope field images in two coordinate axis directions corresponding to the vector gradient field to facilitate performing subsequent operations.

6. The method as claimed in claim 1, wherein the smoothing function is at least one of a Gaussian function or a low-pass filter function.

7. The method as claimed in claim 1, wherein the truncation threshold is a grayscale value threshold determined by the partial derivative function placed when the vector gradient field is generated and the grayscale value range of the initially obtained auxiliary grayscale image; and in response to using the truncation threshold to intercept the initial auxiliary grayscale image, the extracted polygon contour is consistent with the edges of the curvilinear polygon image.

8. The method as claimed in claim 1, wherein the curvilinear polygon image comprises curvilinear polygon image and Manhattan image.

9. The method as claimed in claim 1, wherein when modulating the grayscale value of the respective edgelet, the grayscale value of a center point or a control point on the respective edgelet is modulated, and then the nearby grayscale values thereof is modulated, wherein the center point or the control point does not always need to be on a pixel point, but may be any point on the respective edgelets.

10. An electronic apparatus, comprising:
at least one storage configured to store a program; and
at least one processor configured to perform the program stored in the storage, wherein in response to performing the program stored in the storage, the processor is configured to perform the method as claimed in claim 1.

11. A curvilinear polygon image scaling system, comprising:
a gradient field obtaining module, configured to place a partial derivative at each point on edges of a curvilinear polygon image to obtain a vector gradient field;
an auxiliary grayscale image obtaining module, configured to integrate the vector gradient field and use an integrated value as a grayscale value to obtain an auxiliary grayscale image;
a segmentation module, configured to segment the edges of the curvilinear polygon image and determine a position of each edgelets;
a grayscale modulation module, configured to perform modulation, on the auxiliary grayscale image, to grayscale values of the respective edgelets based on a preset image scaling parameter and the obtained vector gradient field and perform modulation to nearby grayscale values thereof by using a smoothing function so that the grayscale values in a modulated area change continuously to obtain an updated auxiliary grayscale image; and
an image interception module, configured to intercept the updated auxiliary grayscale image by using a truncation threshold and to extract a polygon contour, wherein if a difference between an edge placement error of the respective edgelet, which is calculated between the currently extracted polygon contour and the original curvilinear polygon image, and the image scaling parameter is less than a preset small value, then the currently extracted polygon contour is used and outputted as the curvilinear polygon image after scaling according to the image scaling parameter; otherwise, iterative modulation is performed on the updated auxiliary grayscale image to grayscale values of respective points whose differences are not less than the preset small value and nearby grayscale values thereof until the differences of the respective points on a finally extracted polygon contour are less than the preset small value, and the finally extracted polygon contour is output as the curvilinear polygon image.

12. The system as claimed in claim 11, wherein performing iterative modulation, on the updated auxiliary grayscale image, to the grayscale values of the respective points whose differences are not less than the preset small value and the nearby grayscale values thereof comprises: wherein the gradient field obtaining module is further configured to place a partial derivative at each point in the currently extracted polygon contour whose difference is not less than the preset small value to obtain a vector gradient field; and
the grayscale modulation module is further configured to perform modulation, on the updated auxiliary grayscale image, to grayscale values of the respective points and perform modulation to nearby grayscale values thereof by using the smoothing function based on a latest vector gradient field, an edge placement error corresponding to the respective point, and the image scaling parameter, so that the grayscale values in a modulated area change continuously to obtain an auxiliary grayscale image updated once again.

* * * * *